(12) United States Patent
Uchida

(10) Patent No.: US 6,314,270 B1
(45) Date of Patent: Nov. 6, 2001

(54) FIXED SUBSCRIBER UNIT

(75) Inventor: Osamu Uchida, Yokohama (JP)

(73) Assignee: Matsushita Electric Industrial, Co., Ltd., Osaka (JP)

( * ) Notice: Subject to any disclaimer, the term of this patent is extended or adjusted under 35 U.S.C. 154(b) by 0 days.

(21) Appl. No.: 09/080,287

(22) Filed: May 18, 1998

(30) Foreign Application Priority Data

May 23, 1997 (JP) .................................................. 9-148435

(51) Int. Cl.[7] .............................. H04B 17/00; H04M 1/24
(52) U.S. Cl. ........................ 455/67.1; 455/573; 379/413
(58) Field of Search .................................. 379/413, 419; 455/572, 573, 67.1

(56) References Cited

U.S. PATENT DOCUMENTS

| | | | | |
|---|---|---|---|---|
| 5,333,176 | * | 7/1994 | Burke et al. ............................ | 455/557 |
| 5,343,136 | * | 8/1994 | Yamaguchi et al. .................. | 320/103 |
| 5,603,095 | * | 2/1997 | Uola ..................................... | 455/67.1 |
| 5,726,636 | * | 3/1998 | Hayes, Jr. ............................ | 340/636 |
| 5,838,771 | * | 11/1998 | Moeller ................................ | 379/37 |
| 5,901,361 | * | 5/1999 | Luong ................................... | 455/517 |
| 6,169,883 | * | 1/2001 | Vimpari et al. ...................... | 455/67.1 |

* cited by examiner

*Primary Examiner*—Tālivaldis Ivars Šmits
(74) *Attorney, Agent, or Firm*—Stevens, Davis, Miller & Mosher, LLP

(57) ABSTRACT

A fixed subscriber unit includes a voltage measuring unit which acquires a DC input voltage value to be applied to a power circuit, and a comparator/judging unit which compares a preset DC voltage with the DC voltage measurement and judges whether the power circuit is driven by the DC voltage from an AC/DC adaptor or by the DC voltage supplied from a charge battery. When the power circuit is driven by the charge battery, the available operation time of the fixed subscriber unit is calculated by a calculation unit from the DC voltage measurement. The information thus obtained on the driving power state and/or the available operation time are aurally or visually notified to the user by a notification unit. The user thus can select an appropriate method of using the fixed subscriber unit according to the prevailing situation.

9 Claims, 2 Drawing Sheets

FIXED SUBSCRIBER UNIT

BACKGROUND OF THE INVENTION

1. Field of the Invention

The present invention relates to a fixed subscriber unit in which at least one telephone set connected thereto by wire can send and receive calls by radio to and from and speak with another telephone set connected to a public telephone network, or more particularly to a fixed subscriber unit in which the user is supplied with the information as to whether the fixed subscriber unit is driven by an AC/DC adaptor or by a power back-up charge battery unit and so on.

2. Description of the Related Art

FIG. 1 is a block diagram showing a configuration of a conventional fixed subscriber unit. A conventional fixed subscriber unit 1 is connected by wire to one or a plurality of telephone sets for sending and receiving through an antenna 2 a radio wave to and from a base station (not shown) connected to a public telephone network. A radio section 3 demodulates the signal received from the antenna 2 into an audio signal on the one hand and modulates the audio signal from the telephone 13 and transmits it by way of the antenna 2 on the other hand. A two-wire/four-wire converter 4 converts two telephone wires for connecting the telephone set 13 to a total of four wires including two transmit wires and two receive wires to be connected to the radio section 3. In the case of a non-balanced circuit, one of the two transmit or receive wires is connected to the earth and is not shown.

A ringing tone generator 6 sends out a ringing tone for sounding the ringer of the telephone set 13. A relay 7 switches the telephone wires for connection to the telephone 13 between the two-wire/four-wire converter 4 and the ringing tone generator 6. A hooking detector 8 is for detecting the on/off-hook state of the telephone set 13 by monitoring the current in the telephone wire connected to the telephone set 13. A DTMF detector 9 detects a DTMF signal sent by the telephone set 13. A DT·BT generator 10 generates a DT (dial tone) and BT (busy tone) to be sent to the telephone set 13.

A controller 21 controls the radio section 3, the ringing tone generator 6, the relay 7 and the DT·BT generator 10 by the signals from the radio section 3, the hooking detector 8 and the DTMF detector 9, so that the telephone set 13 can send and receive a call and speak by radio with other telephone sets connected to the public telephone network. The telephone set 13 is connected by wire to the fixed subscriber unit 1.

A power circuit 12 supplies a DC voltage to each part in the fixed subscriber unit 1. An AC receptacle cable 14 transmits an AC voltage from a home AC receptacle to an AC/DC adaptor 15. The AD/DC adaptor 15 converts an AC voltage to a predetermined DC voltage and outputs the DC voltage.

A power back-up charge battery unit 16 supplies a DC voltage, when supplied from the AC/DC adaptor 15, directly to the power circuit 12 while at the same time charging the charge battery thereof, if the battery is not sufficiently charged. In the case where the DC voltage is not supplied from the AC/DC adaptor 15 due to a power failure or the like cause, the DC voltage of the charge battery is supplied to the power circuit 12. This power back-up charge battery unit 16 can be either built in or attached to the exterior of the fixed subscriber unit 1.

Now, the operation of the conventional fixed subscriber unit will be described. In FIG. 1, upon receipt of a call from another telephone through a radio base station, the controller 21 receives call-in information from the radio section 3. Then, the controller 21 controls the ringing tone generator 6 and the relay 7 to send out a ringing tone to the telephone set 13. When the telephone 13 goes off the hook, the controller 21 acquires the off-hook information from the hooking detector 8, controls the relay 7 and connects the telephone 13 with the other telephone for transmitting and receiving signals through the antenna 2, the radio section 3 and the two-wire/four-wire converter 4.

In this way, the conventional fixed subscriber unit 1 makes possible speech by radio between at least one telephone set connected by wire to the fixed subscriber unit 1 and other telephone sets connected to the public telephone network.

As to the power system, the AC voltage obtained from a home AC receptacle is converted into a fixed DC voltage by the AC/DC adaptor 15, and supplied to the power circuit 12 through the power back-up charge battery unit 16. In the process, the power back-up charge battery unit 16, if the charge battery thereof is not sufficiently charged, supplies the DC voltage of the AC/DC adaptor 15 to the power circuit 12 while at the same time charging the charge battery thereof. In the case where the DC voltage output of the AC/DC adaptor is stopped due to a power failure or a loosened AC receptacle, the DC voltage output of the charge battery in the power back-up charge battery unit 16 is supplied to the power circuit 12, so that the operation of the fixed subscriber unit 1 is made possible for a time period during which the DC output voltage of the charge battery is maintained in a certain range.

In the above-mentioned fixed subscriber unit 1 described above, the user cannot not be informed in the case where the DC voltage output of the AC/DC adaptor 15 stops due to a power failure or a loosened AC receptacle cable 14 and the fixed subscriber unit 1 is driven by the output voltage of the charge battery of the power back-up charge battery unit 16. The user is, therefore, neither informed that the remaining available speech time is limited since the power for the operation is supplied from the power back-up charge battery unit 16.

SUMMARY OF THE INVENTION

The object of the present invention is to solve the above-mentioned problems of the prior art and to provide a superior fixed subscriber unit comprising means for judging whether the fixed subscriber unit is driven by the voltage output of an AC/DC adaptor or by the charge battery in a power back-up charge battery unit, and means for visually or aurally transmitting the related information to the user.

According to the present invention, there is provided a fixed subscriber unit connected to at least one telephone set by wire, comprising a radio section for transmitting and receiving signals to and from a base station connected to a public telephone network, a signal processing section for processing signals between the telephone set and the radio section such that the telephone set can communicate with another telephone set connected to the public telephone network, a power circuit for supplying electric power to each section of the fixed subscriber unit when connected to a power back-up charge battery unit connectable to an AC/DC adaptor for outputting a DC voltage when supplied with electric power from an external AC power supply, voltage measuring means for measuring an output voltage of the power back-up charge battery unit, comparator/judging means for comparing the measured voltage with a predetermined voltage and judging whether the power circuit is supplied with electric power from the external AC power supply through the power back-up charge battery unit or only from the power backup charge battery unit, and notification means for notifying an user of information relating to the power back-up charge battery unit on the basis of judgment of the comparator/judging means. The notification means can visually or aurally notify the user whether the power circuit is supplied with electric power from the external AC power supply or only from the power back-up charge battery unit. As a result, the user can select an appropriate method of using the fixed subscriber unit according to the prevailing conditions.

DESCRIPTION OF THE PREFERRED EMBODIMENTS

Embodiments of the invention will be described with reference to FIG. 2.
(First Embodiment)

Figure 1:
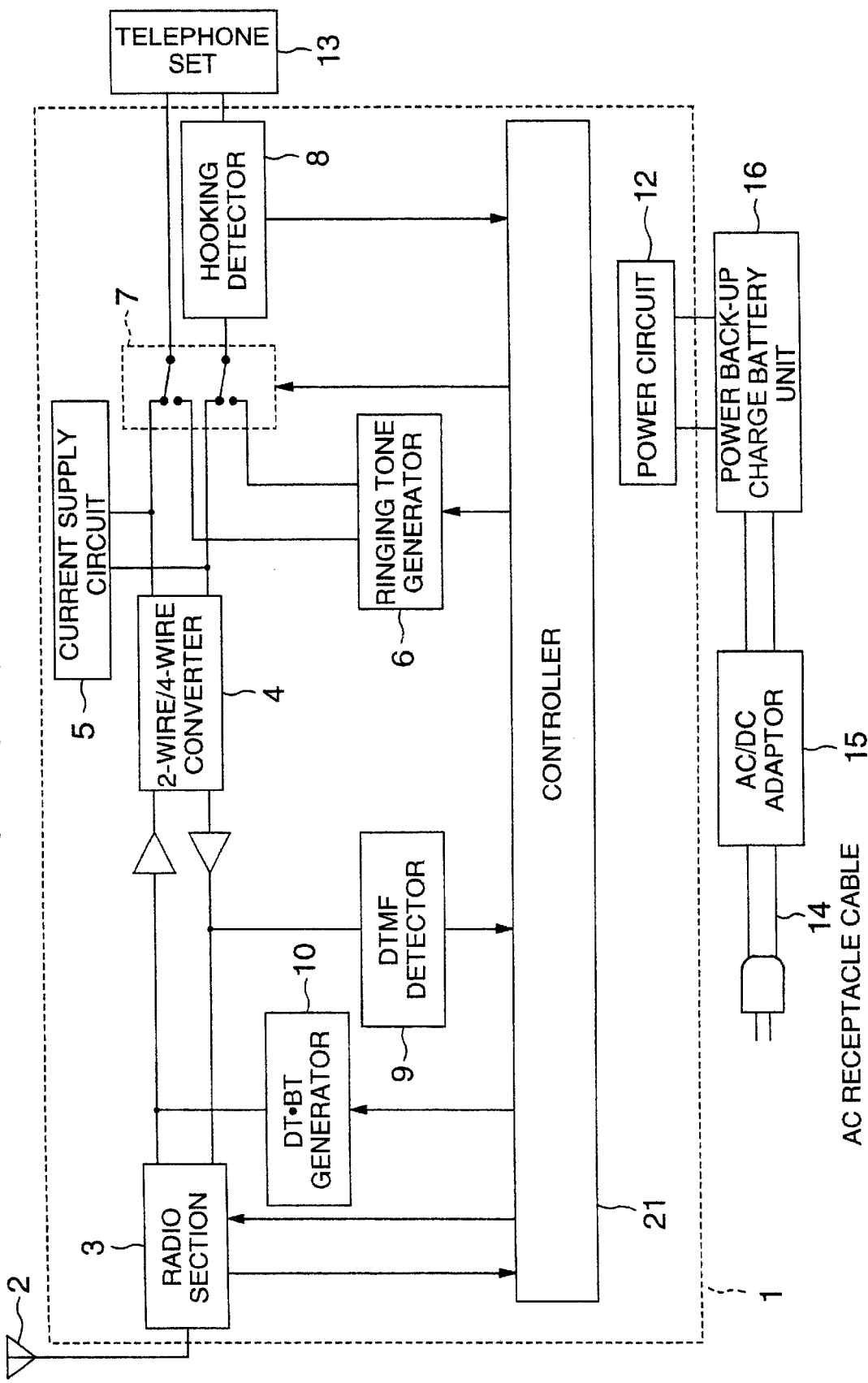
FIG. 1 is a block diagram showing a basic configuration of a conventional fixed subscriber unit.
Figure 2:
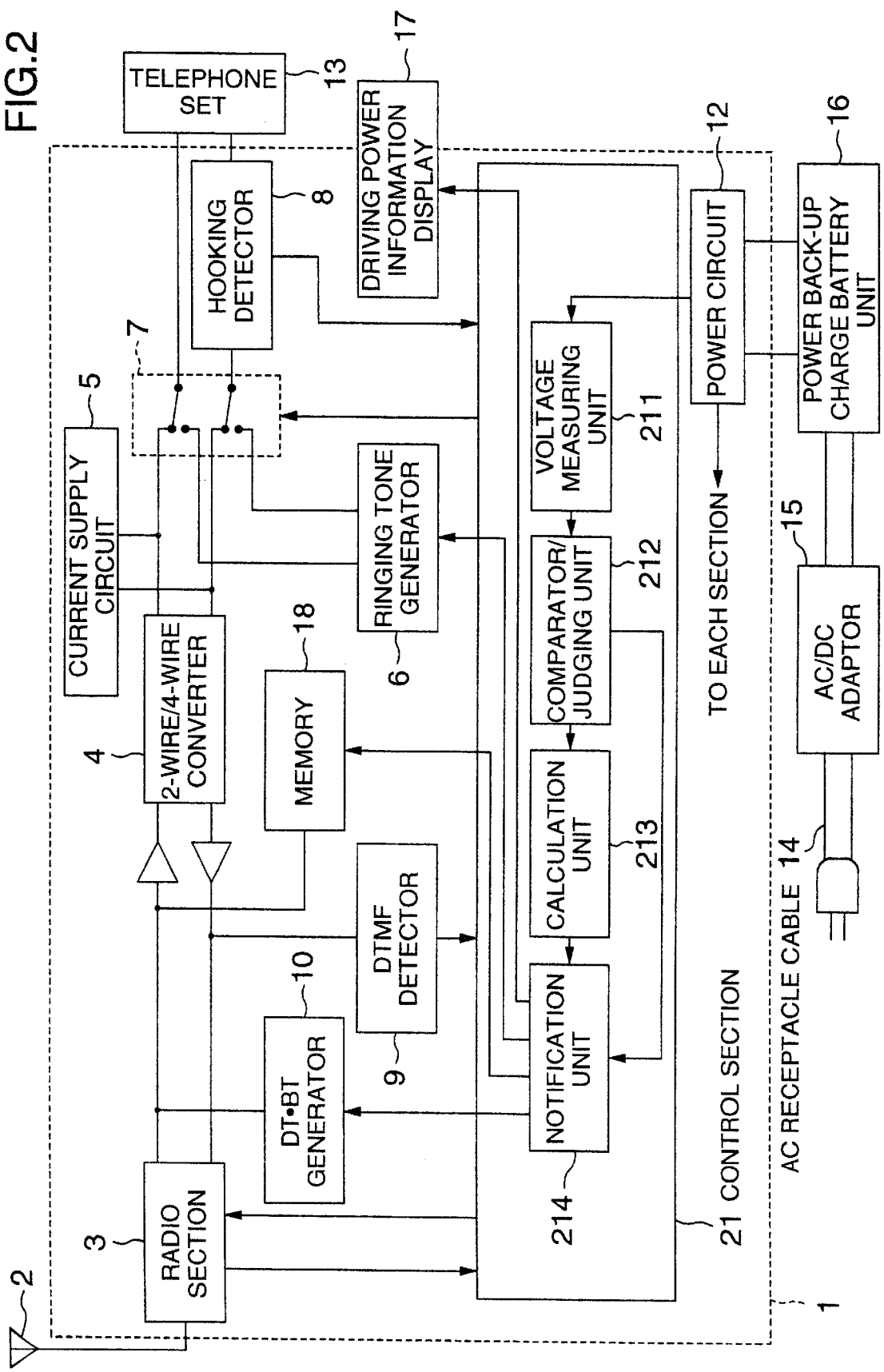
FIG. 2 is a block diagram showing a basic configuration of a fixed subscriber unit according to the invention.

A configuration of a fixed subscriber unit according to a first embodiment of the invention is shown in FIG. 2. In FIG. 2, a fixed subscriber unit 1 is connected by wire to one or a plurality of telephone sets 13 and adapted to transmit and receive a radio wave through an antenna 2 to and from a base station (not shown) connected to a public telephone network. A radio section 3 demodulates a signal received from the antenna 2 into an audio signal, modulates the audio signal from the telephone set 13, and transmits the modulated signal by way of the antenna 2. A two-wire/four-wire converter 4 converts two telephone wires for connecting the telephone set 13 into a total of four wires including two for transmission and two for receiving. In the case of a non-balanced circuit, on the other hand, one of the two transmit or receive wires is grounded and is not shown. A current supply circuit 5 supplies a current to the telephone line for connecting the telephone set 13.

A ringing tone generator 6 sends out a ringing tone for sounding the ringer of the telephone set 13. A relay 7 switches the telephone wire for connecting the telephone set 13 between the two-wire/four-wire converter 4 and the ringing tone generator 6. A hooking detector 8 detects the on-hook or off-hook state of the telephone set 13 by monitoring the current flowing in the telephone wire connecting the telephone set 13. A DTMF detector 9 detects a DTMF signal sent out by the telephone set 13. DT·BT generator 10 generates a DT (dial tone) and BT (busy tone) to be sent to the telephone set 13.

A controller 21 controls the radio section 3, the ringing tone generator 6, the relay 7 and the DT·BT generator 10 in response to a signal from the radio section 3, the hooking detector 8 and the DTMF detector 9, so that the telephone set 13 can, by radio, send and receive a call to and from and speak with other telephone sets connected to the public telephone network. The telephone set 13 is connected by wire to the fixed subscriber unit 1.

A power circuit 12 supplies a DC voltage to each part in the fixed subscriber unit 1. An AC receptacle cable 14 transmits the AC voltage from a home AC receptacle to an AC/DC adaptor 15. The AC/DC adaptor converts the AC voltage into a fixed DC voltage and outputs the DC voltage.

A power back-up charge battery unit 16 supplies a DC voltage, if supplied from the AC/DC adaptor 15, to the power circuit 12 directly, while at the same time charging the charge battery thereof, if the battery is not sufficiently charged. In the case where the DC voltage is not supplied from the AC/DC adaptor 15 due to a power failure or the like cause, the DC voltage of the charge battery is supplied to the power circuit 12. The power back-up charge battery unit 16 can be either built in or attached to the exterior of the fixed subscriber unit 1.

A driving power information display 17 visually informs the user of the information on the driving power state and/or the available operation time. The driving power information display 17 can be omitted in the case where the fixed subscriber unit aurally informs the user of the information on the driving power state and/or the available operation time.

The operation of the first embodiment will be explained. In FIG. 2, the power system of the fixed subscriber unit 1 acquires power of AC voltage from the home AC receptacle, which AC voltage is converted into a fixed DC voltage by the AC/DC adaptor 15 and supplied through the power back-up charge battery unit 16 to the power circuit 12. In the process, the power back-up charge battery unit 16, if the battery thereof is not sufficiently charged, charges it while at the same time supplying the DC voltage from the AC/DC adaptor 15 to the power circuit 12.

In the case where the DC voltage output of the AC/DC adaptor stops due to an electric power failure or a loosened receptacle, the DC voltage output of the charge battery in the power back-up charge battery unit 16 is supplied to the power circuit 12. The DC voltage output of the charge battery thus is held thereby to make the fixed subscriber unit 1 operable for a time period during which the DC output voltage of the charge battery is maintained in a certain range.

The controller 21 includes therein a voltage measuring unit 211, a comparator/judging unit 212 and a notification unit 214. The input DC voltage to the power circuit 12 is measured by the voltage measuring unit 211. The comparator/judging unit 212 compares the measured DC voltage with a preset or predetermined DC voltage value information, and thus determines the state of driving power, that is, whether the input DC voltage is output from the AC/DC adaptor 15 or only from the charge battery in the power back-up charge battery unit 16.

A calculation unit 213, on the other hand, includes a correspondence table between the output DC voltage value and the remaining capacity of the charge battery and the available operation time of the fixed subscriber unit 1. This table takes in account the fact that the battery output DC voltage decreases with the decrease in the remaining battery capacity. The calculation unit 213 calculates the remaining available operation time of the fixed subscriber unit 1 with reference to this table while being driven by the charge battery.

The notification unit 214 transmits the information on the driving power state and/or the available operation time determined in this way to the driving power information display 17 and notifies them visually to the user. The driving power information display 17 may include a LED, for example, notifying the user by changing the flickering period or the color of the LED, or may include a liquid crystal display for displaying the information to the user by changing indication of the liquid crystal display.

As described above, according to the first embodiment, the user can acquire information as to whether or not the fixed subscriber unit 1 is driven by only the charge battery and/or information on the remaining available operation time. Thus, the user can select an appropriate method of using the fixed subscriber unit 1 according to the prevailing situation, for example, by shortening his/her speech when the fixed subscriber unit 1 is being driven by the charge battery.

(Second Embodiment)

This embodiment is also shown in FIG. 2 and is similar to the first embodiment up to the stage where the controller 21 acquires the information on the driving power state and so on. The second embodiment, however, employs a method of notifying the user aurally or audibly through the telephone set 13, instead of the visual method as in the first embodiment.

When the user is speaking through the telephone set 13 or has lifted the handset for speech, the notification unit 214 in the controller 21 aurally notifies the user of the driving power state and/or the available operation time by controlling the DT·BT generator 10 to send a signal of a specific frequency or period to the telephone set 13.

Upon arrival of a telephone call, the user can be supplied with the information on the driving power state and/or the available operation time from the notification unit 214 in the controller 21 by controlling the ringing tone generator 6 to send out a ringing tone of a specific frequency or period or an alarm sound to the telephone set 13. In such a case, even in the case where the fixed subscriber unit 1 is installed in a place invisible from the user, the user can be notified of the driving power state and/or the available operation time.

As described above, according to the second embodiment, the user is notified aurally whether or not the fixed subscriber unit 1 is driven by the charge battery and how long available operation time remains. Even in the case where the fixed subscriber unit 1 is installed at a place invisible from the user, therefore, the user can be notified of the driving power state and/or the available operation time.

(3rd Embodiment)

The third embodiment is also shown in FIG. 2 and similar to the first embodiment up to the stage where the controller 21 acquires the information on the driving power state and so on. The third embodiment, however, employs a method of informing the user by sending out audio information through the telephone set 13 instead of the above-mentioned method of informing the user by changing the period or frequency of the BT (busy tone) or DT (dial tone) as in the second embodiment.

When the user is speaking through the telephone set 13 or has lifted the handset for speech, the notification unit 214 in the controller 21 controls the audio information stored in a memory 18 thereby to transmit the audio information to the telephone set 13. By doing so, even in the case where the fixed subscriber unit 1 is installed at a place invisible from the user, the user can be notified of the driving power state and/or the available operation time.

In this way, according to the third embodiment, the information as to whether or not the fixed subscriber unit 1 is driven by the charge battery or as to how long is the available operation time is notified to the user by audio information. Even in the case where the fixed subscriber unit 1 is installed at a place invisible from the user, therefore, the user can be notified of the driving power state and/or the available operation time.

It will thus be understood from the foregoing description that, according to the present invention, there is provided a fixed subscriber unit 1 comprising means for judging whether the fixed subscriber unit 1 is driven by a DC voltage derived from the AC/DC adaptor 15 or by a DC voltage only due to the charge battery in the power back-up charge battery unit 16, and means for visually or aurally notifying the user of the information as to the driving power state and/or the available operation time. The user thus can select an appropriate method of using the fixed subscriber unit in accordance with the prevailing situation.

In the case where the method of aural notification is employed, the user can be notified of the driving power state and/or the available operation time even when the fixed subscriber unit is installed at a place invisible from the user.

What is claimed is:

1. A fixed subscriber unit connected by wire means to at least one telephone set which has its power supplied from said fixed subscriber unit through said wire means, said fixed subscriber unit comprising:

a radio section for transmitting and receiving radio signals to and from a base station connected to a public telephone network;

a signal processing section for processing signals between said at least one telephone set and said radio section such that said at least one telephone set can communicate with another telephone set connected to said public telephone network;

a power back-up charge battery unit for being connected to an AC/DC adaptor, said AC/DC adaptor outputting a DC voltage when supplied with an electric power from an external AC power supply, wherein, when a DC voltage is being output by said adaptor, said power back-up charge battery unit supplies an output comprising said DC voltage while charging a battery of said power back-up charge battery unit, and when a DC voltage is not being supplied from said adaptor, said power back-up charge battery unit supplies an output comprising output power from said battery;

a power circuit for supplying electric power to each section of said fixed subscriber unit when connected to said power back-up charge battery unit;

voltage measuring means for measuring an output voltage of said power back-up charge battery unit;

comparator/determining means for comparing the measured voltage with a predetermined voltage and determining whether said power circuit is supplied with electric power from said external AC power supply through said power back-up charge battery unit or only from said power back-up charge battery unit;

ringing tone signal generating means for generating a ringing tone signal for notifying a user of said at least one telephone set of information regarding said power back-up charge battery unit, on the basis of a determination of said comparator/determining means; and notification means for notifying said user of the information on said power back-up charge battery unit by sending said generated ringing tone signal to said at least one telephone set through said wire means.

2. A fixed subscriber unit according to claim 1, wherein said notification means comprises means for visually notifying the user as to whether said power circuit is supplied with electric power from said external AC power supply through said power back-up charge battery unit or only from said power back-up charge battery unit.

3. A fixed subscriber unit according to claim 1, further comprising:

calculation means for calculating an available operation time of said power back-up charge battery unit in the case where said power circuit is supplied with electric power only from said power back-up charge battery unit.

4. A fixed subscriber unit according to claim 3, wherein said notification means comprises means for visually notifying the user of said available operation time.

5. A fixed subscriber unit according to claim 3, wherein said notification means notifies the user of the available operation time by controlling at least one of a frequency and a period of generation of said ringing tone signal on the basis of a calculation result of said calculation means.

6. A fixed subscriber unit according to claim 4, wherein said predetermined tone is a dial tone.

7. A fixed subscriber unit according to claim 4, wherein said predetermined tone is a busy tone.

8. A fixed subscriber unit according to claim 3, wherein said notification means notifies the user of the available operation time as audio information by controlling a memory for storing the audio information, on the basis of a calculation result of said calculation means.

9. A fixed subscriber unit according to claim 1, wherein:

said wire means comprises two telephone wires; and said fixed subscriber unit further comprises a two-wire/four-wire converting means for converting said two telephone wires to a total of four wires including two transmit wires and two receive wires, said total of four wires being connected to said radio section.

* * * * *